(12) United States Patent
Ghosh (10) Patent No.: US 12,547,334 B2
(45) Date of Patent: Feb. 10, 2026

(54) REFRESH OF STALE REFERENCE TO PHYSICAL FILE LOCATIONS

(71) Applicant: Capital One Services, LLC, McLean, VA (US)

(72) Inventor: Nishit Ghosh, Aurora, IL (US)

(73) Assignee: Capital One Services, LLC, McLean, VA (US)

( * ) Notice: Subject to any disclaimer, the term of this patent is extended or adjusted under 35 U.S.C. 154(b) by 271 days.

(21) Appl. No.: 18/048,173

(22) Filed: Oct. 20, 2022

(65) Prior Publication Data

US 2024/0134555 A1 Apr. 25, 2024
US 2024/0231664 A9 Jul. 11, 2024

(51) Int. Cl.
*G06F 3/06* (2006.01)

(52) U.S. Cl.
CPC .......... *G06F 3/0643* (2013.01); *G06F 3/0619* (2013.01); *G06F 3/067* (2013.01)

(58) Field of Classification Search
CPC ....... G06F 3/0643; G06F 3/0619; G06F 3/067
See application file for complete search history.

(56) References Cited

U.S. PATENT DOCUMENTS

| | | | |
|---|---|---|---|
| 7,890,469 B1 | 2/2011 | Maionchi et al. | |
| 2005/0114403 A1* | 5/2005 | Atchison | G06F 16/972 |
| 2006/0224695 A1* | 10/2006 | Willis | H04L 67/53 |
| | | | 709/217 |
| 2009/0288093 A1* | 11/2009 | Thurgood | G06F 8/36 |
| | | | 718/104 |
| 2010/0042867 A1* | 2/2010 | Guven | G06F 11/0748 |
| | | | 714/2 |
| 2011/0213783 A1* | 9/2011 | Keith, Jr. | G06F 16/954 |
| | | | 707/741 |
| 2012/0162461 A1* | 6/2012 | Hatanaka | H04N 23/633 |
| | | | 348/222.1 |
| 2016/0350327 A1* | 12/2016 | Fan | G06F 16/16 |
| 2018/0210771 A1* | 7/2018 | Sato | G06F 9/48 |
| 2020/0089914 A1* | 3/2020 | Komatsubara | G06F 21/51 |
| 2021/0097025 A1* | 4/2021 | Polozkov | G06F 16/152 |

* cited by examiner

*Primary Examiner* — Eric T Loonan
(74) *Attorney, Agent, or Firm* — Harrity & Harrity, LLP (57) ABSTRACT

In some implementations, a server device may identify a first file location for storing data associated with an application and a reference to a file path for the first file location. The server device may store a data stream associated with the application to the first file location using the reference. The server device may periodically execute first instructions associated with checking whether a valid physical file exists in the first file location by opening a connection via the file path, wherein the first instructions are executed independently of second instructions associated with storing the data stream. The server device may selectively cause the data stream to be stored in the first file location or a second file location based on determining whether the valid physical file exists in the first file location.

20 Claims, 7 Drawing Sheets

REFRESH OF STALE REFERENCE TO PHYSICAL FILE LOCATIONS

BACKGROUND

A file path may describe a location of a physical file in a file structure of a data storage device. Physical files contain the actual data that is stored on the data storage device, and a description of how data is to be presented to or received from a program. Logical files do not contain data. Rather, logical files contain a description of records found in one or more physical files. A logical file may be a view or representation of one or more physical files. An application may store data in a physical file. For example, the application may store a reference to a file path associated with the physical file and may write data to the physical file via the file path.

SUMMARY

Some implementations described herein relate to a system for refreshing a reference to physical file locations. The system may include one or more memories and one or more processors coupled to the one or more memories. The one or more processors may be configured to create a first file path for storing log data associated with an application. The one or more processors may be configured to write a data stream of the log data associated with the application to the first file path. The one or more processors may be configured to detect a trigger event associated with checking if the first file path is valid. The one or more processors may be configured to execute, based on detecting the trigger event, code associated with determining whether a physical file exists associated with the first file path. The one or more processors may be configured to create a second file path for storing the log data associated with the application upon determining that the physical file does not exist. The one or more processors may be configured to write, based on updating the reference to the second file path, the data stream of the log data associated with the application to the second file path.

Some implementations described herein relate to a method for refreshing a stale reference to file locations for storing data. The method may include identifying, by a server device, a first file location for storing data associated with an application and a reference to a file path for the first file location. The method may include storing, by the server device, a data stream associated with the application to the first file location using the reference. The method may include periodically executing, by the server device, first instructions associated with checking whether a valid physical file exists in the first file location by opening a connection via the file path, where the first instructions are executed independently of second instructions associated with storing the data stream. The method may include selectively causing, by the server device, the data stream to be stored in the first file location or a second file location based on determining whether the valid physical file exists in the first file location.

Some implementations described herein relate to a non-transitory computer-readable medium that stores a set of instructions for a device. The set of instructions, when executed by one or more processors of the device, may cause the device to identify a first file location for storing log data associated with an application. The set of instructions, when executed by one or more processors of the device, may cause the device to write a data stream of the log data associated with the application to the first file location. The set of instructions, when executed by one or more processors of the device, may cause the device to detect a trigger event associated with checking if the first file location is valid. The set of instructions, when executed by one or more processors of the device, may cause the device to execute, based on detecting the trigger event, code associated with determining whether a physical file exists in the first file location. The set of instructions, when executed by one or more processors of the device, may cause the device to identify a second file location for storing the log data associated with the application based on determining that the physical file does not exist in the first file location. The set of instructions, when executed by one or more processors of the device, may cause the device to update the reference from the first file location to the second file location.

DETAILED DESCRIPTION

The following detailed description of example implementations refers to the accompanying drawings. The same reference numbers in different drawings may identify the same or similar elements.

A device may execute one or more processes and/or one or more applications to enable the device to perform actions. In some cases, a process and/or application executed by the device may generate data associated with the actions performed by the device. As used herein, a device that generates data may be referred to as a source device and/or an application server. In some cases, a source device (and/or an application executing on the device) may generate a log associated with an action or operation performed by the source device. A log may include data associated with events that have occurred associated with an application executing on the source device. For example, a log may identify one or more scripts, queries, operations, jobs, and/or other information designed to provide information regarding the status of data processing jobs. In some cases, the source device may transmit log data to another device (e.g., a destination device) to enable the other device to analyze, store, and/or compile log data from multiple source devices. For example, the source device may transmit log data to a destination device to be stored in a physical file by indicating a file path associated with the physical file.

Log data may provide insight for an entity related to activity on a system or network of the entity. For example, log data may enable an institution to analyze errors associated with the system or network, to recognize unusual activity on the system or network, to scan for vulnerabilities of the system or network, and/or to detect malicious actors on the system or network, among other examples. Therefore, log data may enable the institution to act on security events (e.g., security attacks or malicious actors identified on the system or network) when necessary, thereby improving the security of the system or network. As another example, downstream applications may use the log data for analytics and/or customer support applications. For example, an application may use the log data to populate a dashboard or other graphical user interface (GUI) to facilitate analytics and/or customer support applications (e.g., to improve access to key performance indicators (KPIs) relevant to the application).

Such applications are now often executed in a cloud computing system, which is often a transient computer environment. The cloud computing system may include virtual servers that are capable of executing the applications. The virtual servers may be launched and later shut down and relaunched in the cloud computing system. A source device may store log data in a cloud computing storage location (e.g., a cloud server or a virtual server) by transmitting the log data and indicating a file path associated with a physical file. The log data may arrive at the source device in a data stream. Therefore, the source device may write (e.g., transmit to be stored) log data to the physical file by providing the log data and indicating the file path of the physical file.

However, in some cases, a physical file may be deleted from a file location associated with the physical file (e.g., by a user, by another application, and/or by a daemon program). An application executing on the source device may be unaware that the physical file has been deleted (e.g., because the application generating and storing the log data may only store a reference to the file path of the physical file). Therefore, the application may continue to write log data to the file path of the physical file (e.g., after the physical file has been deleted). In other words, a folder location or a logical file associated with the physical file may still exist after the physical file has been deleted. However, because the physical file has been deleted, log data written to the file path of the physical file may not be stored. As a result, the log data written to the file path of the physical file may be lost.

In some cases, a policy function of the application (e.g., that is generating and storing the log data) may control where the log data is stored. For example, the policy function may periodically check a size of a physical file. If the size satisfies a threshold, then the policy function may cause the application to store log data in a new physical file (e.g., by creating the new physical file and updating the reference stored by the application to the file path of the new physical file). However, in cases where the physical file is deleted, the size of the physical file may not satisfy the threshold even as new log data is generated (e.g., because the log data is not actually stored in the deleted physical file). Therefore, the application may continue to write the log data to the deleted physical file until the application is rebooted and/or redeployed. For example, an application may generate hundreds, thousands, or millions of log entries each day. Therefore, because the application may write these log entries to the deleted file location, a significant amount of log data may be lost.

Some implementations described herein enable refreshing of a stale reference to physical file locations. "Stale reference" may refer to a reference to a file path of a physical file that has been deleted. For example, an application executing on a source device may create a first file path for storing log data associated with the application. For example, the application may store a reference to the first file path for writing the log data. The application may write, to the first file path, a data stream of the log data associated with the application. For example, the data stream may be associated with log data. The application may detect a trigger event associated with checking whether the first file path is valid. For example, the application may periodically check (e.g., every N minutes, where N is a value such as 1, 2, 4, 5, 15, or another value) whether a physical file is stored in a file location indicated by the first file path. In some implementations, a value of N may be less than or equal to a value of an amount of time associated with a maximum acceptable amount of data loss after an unplanned data-loss incident, such as a recovery point objective (RPO) time. This may ensure that if the physical file is deleted, then the application may be enabled to detect that the physical file has been deleted within the amount of time associated with the maximum acceptable amount of data loss.

For example, the application may execute (e.g., periodically) code or instructions associated with determining whether the physical file exists (e.g., based on detecting the trigger event). The code or instructions may be executed asynchronously and/or independently from code or instructions associated with writing the log data. For example, the code or instructions may generate an asynchronous thread (e.g., a thread of execution in the application) associated with determining whether the physical file exists. In other words, the application may be enabled to determine whether the physical file exists at the same time (or at least partially overlapping time) as writing the log data to the first file path.

The application may create a second file path for storing the log data associated with the application based on determining that the physical file does not exist. For example, if the application determines that the physical file does not exist (e.g., has been deleted), then the application may create or generate a new physical file. A file location of the new physical file may be indicated by the second file path. The application may update a reference stored by the application for writing the log data to the second file path. The application may write, based on updating the reference to the second file path, the data stream of the log data associated with the application to the second file path. Although examples are described herein in connection with log data, implementations described herein may be similarly applied for applications storing different types of data to a remote or cloud-based storage location.

As a result, an application that generates and stores data (e.g., log data) may be enabled to detect that a physical file, indicated by a file path referenced by the application for storing the data, has been deleted. For example, periodically creating an asynchronous thread of execution may enable the application to check whether a physical file where data is being written to has been deleted. In other words, this may enable the application to be aware of the status of the actual physical file. This may enable the application to create a new physical file and update the reference stored by the application to write the data to the new physical file when the physical file has been deleted. As a result, data loss when the physical file is deleted may be reduced. For example, the application may not continue to write data to the deleted physical file. For example, the application may execute code associated with determining whether the physical file has been deleted based on an amount of time (e.g., N minutes) from a time at which the code was last executed. Because the amount of time (e.g., N minutes) may be less than or equal to an amount of time associated with a maximum acceptable amount of data loss after an unplanned data-loss incident, data lost due to the physical file being deleted may be reduced to an acceptable amount of data loss (e.g., as defined by an RPO).

Figure 1A:
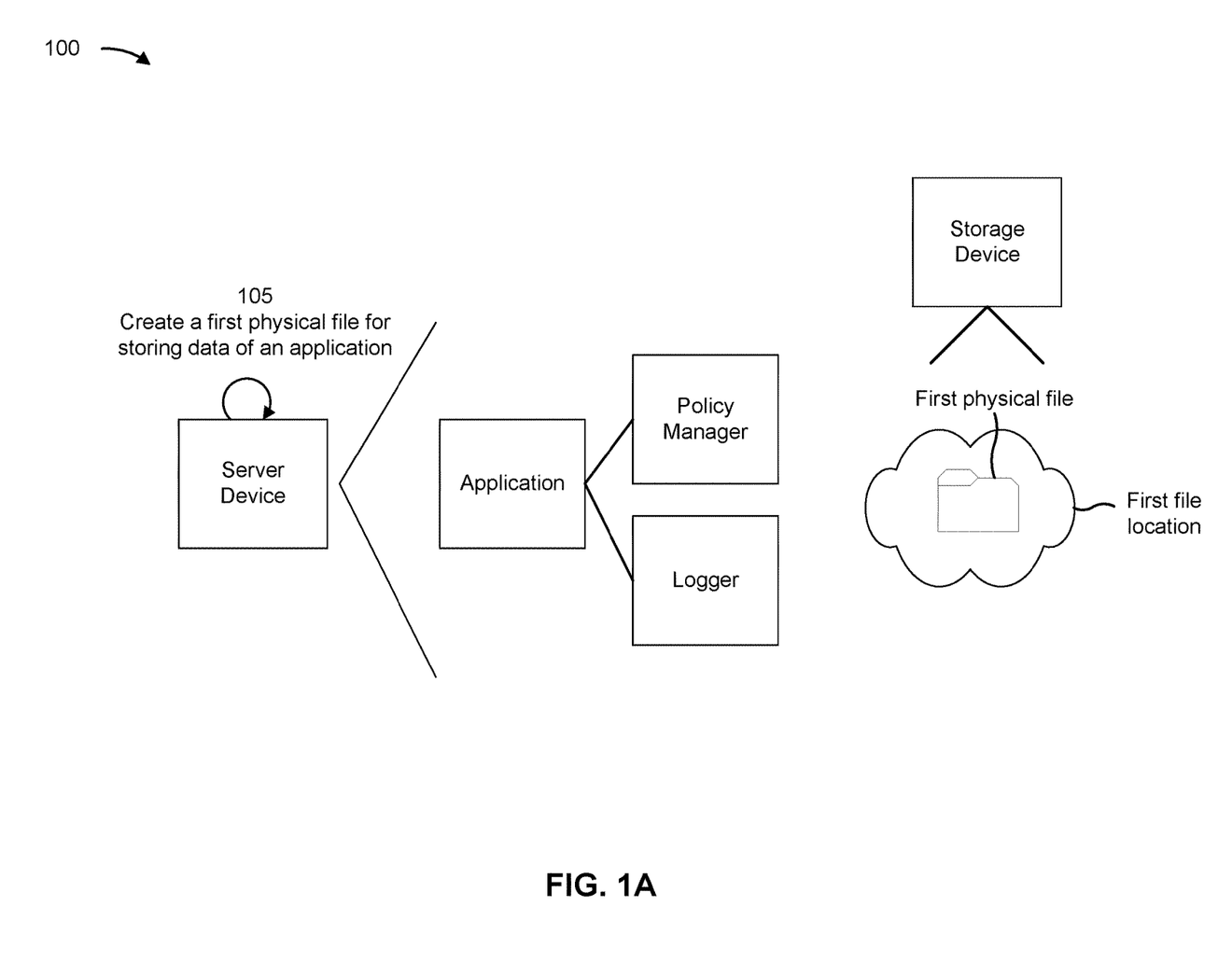
FIGS. 1A-1C are diagrams of an example associated with a refresh of a stale reference to a physical file location, in accordance with some embodiments of the present disclosure.
Figure 1B:
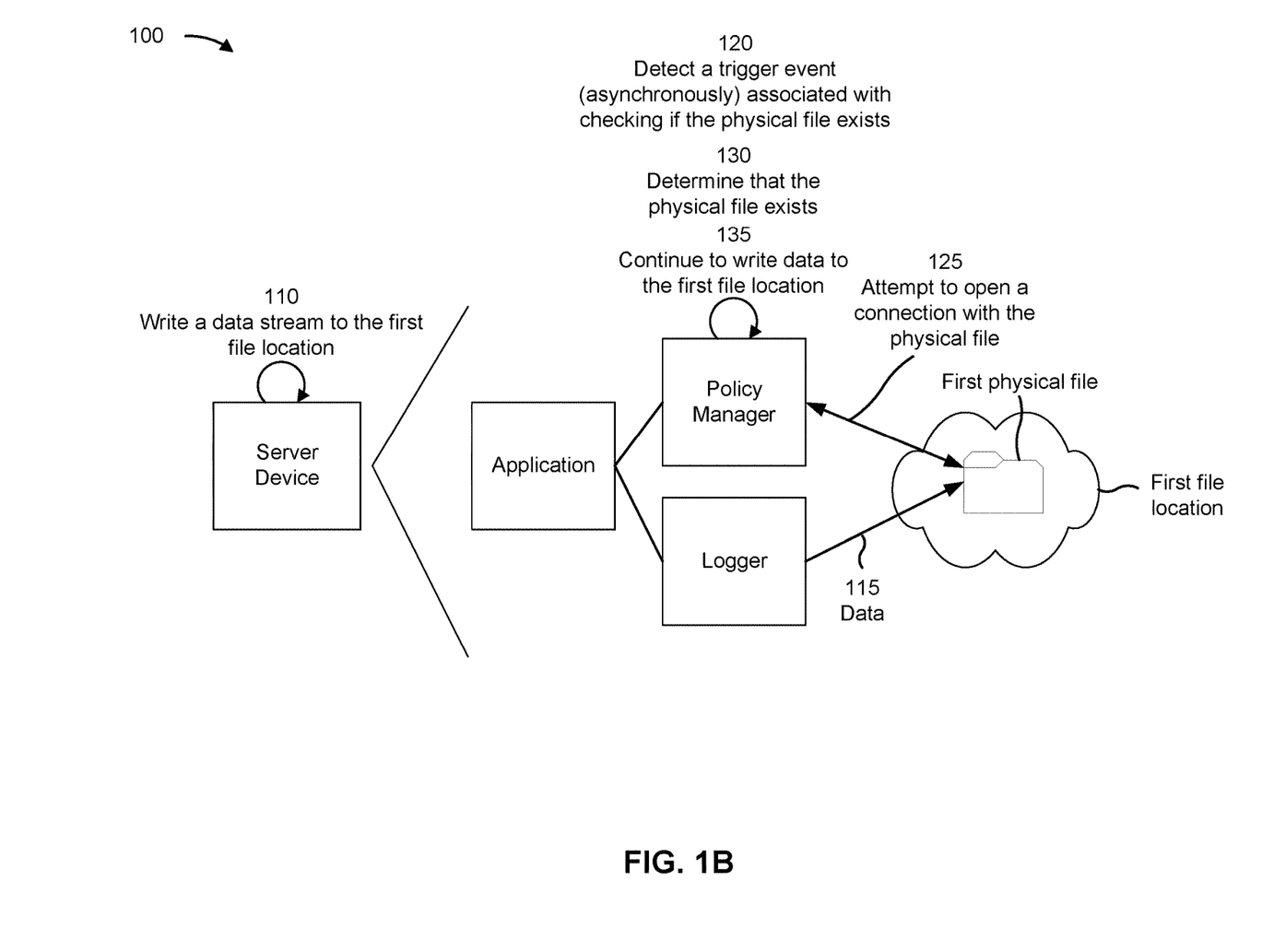
Figure 1C:
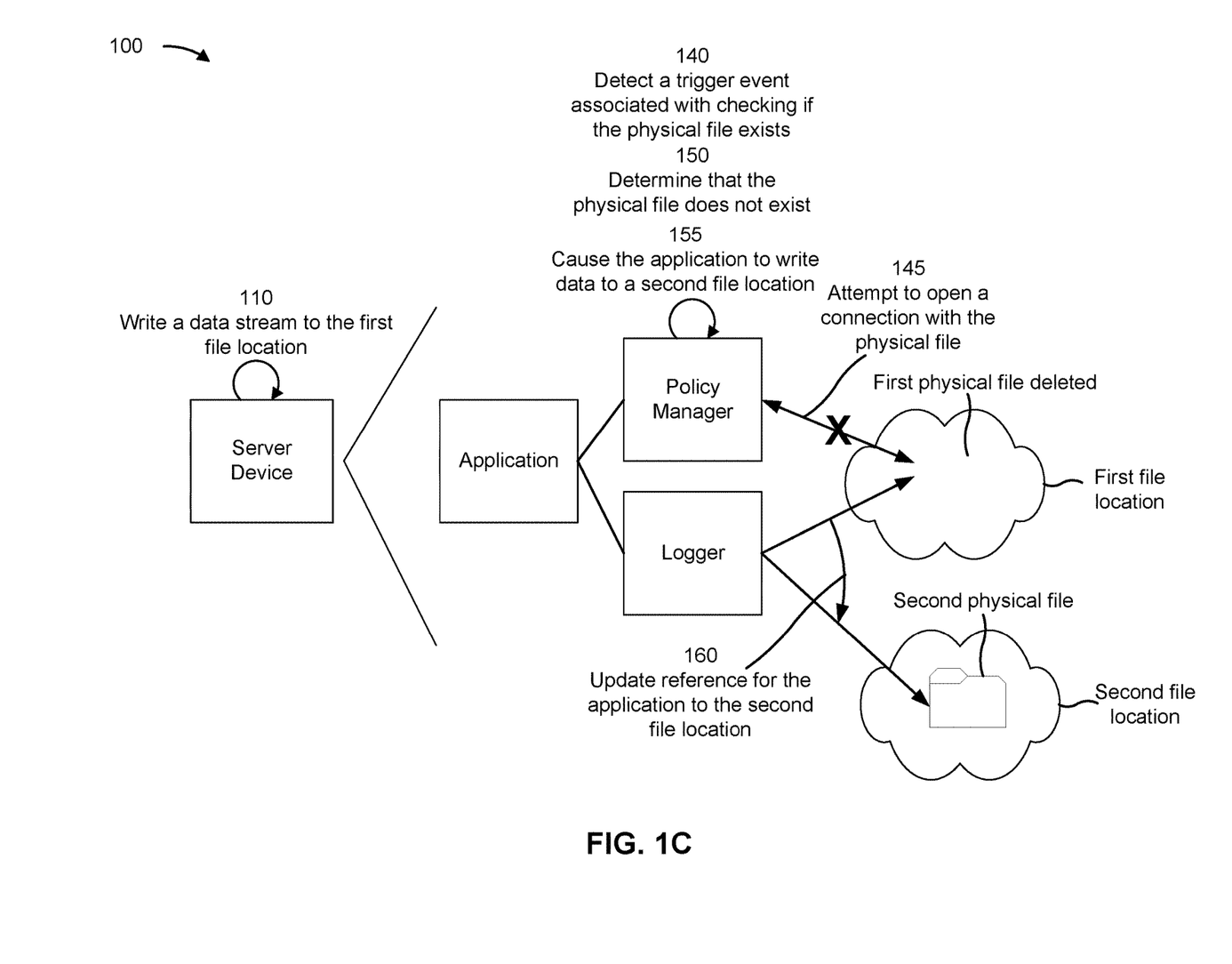

FIGS. 1A-1C are diagrams of an example 100 associated with a refresh of a stale reference to a physical file location. As shown in FIGS. 1A-1C, example 100 includes a server device, an application executing on the server device, and a storage device. These devices are described in more detail in connection with FIGS. 2 and 3.

The server device may be a source device associated with generating data, and the storage device may be a destination device associated with storing the data. In some implementations, the server device and the storage device may be, or may be included in, the same device. In some implementations, the storage device may be a cloud-based or virtual storage location.

As shown in FIG. 1A, the server device may execute the application. For example, the application may be deployed on the server device via a container. A container may be a unit of software that packages all code or other executables needed to execute the application. For example, containers may be a form of operating system virtualization. The container may be a package of software that, when deployed on the server device, causes the application to be executed. The application may be associated with a programming language, such as Java®, Python®, and/or Scala®, among other examples. In some implementations, the container may include instructions or code associated with a policy manager and a logger. The logger may be a function of the application associated with generating and/or storing log data that is associated with the application. The policy manager may manage a file and/or a file path associated with storing the log data. For example, the policy manager may determine when a new file is to be created (e.g., in the storage device) for storing the log data.

As shown by reference number 105, the server device may create a first physical file for storing data (e.g., log data) of the application. For example, the server device (e.g., the application, the policy manager, and/or the logger) may create a first file path for storing log data associated with an application. A file path (sometimes referred to simply as a "path") may be a string of characters used to uniquely identify a location in a directory structure (e.g., in the storage device). For example, the file path may be composed by following a directory tree hierarchy in which components, separated by a delimiting character, represent each directory. The delimiting character may be a slash ("/"), a backslash ("\"), and/or a colon (":"), though some systems may use a different delimiting character. A file path may include a volume or drive letter (e.g., indicating a drive or disk drive associated with a physical file), one or more directory names (e.g., separated by a delimiting character), and/or a file name (e.g., identifying the physical file). As an example, a file path may be "C:\Document\Folder1\Document.Doc" where the drive is the "C" drive, the directory names are "Documents" and "Folder 1," and the file name is "Document.Doc."

In some examples, the file path may be an absolute file path or a relative file path. An absolute file path may contain a root element and a complete directory list required to locate the physical file. A relative file path may be used in combination with another file path to locate the physical file. The server device may create a first physical file and identify the first file path associated with the first physical file for storing data (e.g., log data) generated by the application. For example, a first file location may be created or generated on memory of the storage device. The physical file may be located in the first file location. As an example, the first file location may be a cloud-based storage location. The first file path may include information associated with identifying a storage location (e.g., the first file location) of the first physical file.

The application (e.g., the policy manager and/or the logger) may store a reference to the first file path for writing log data. For example, the reference may be a pointer for writing data. For example, the reference may be to a memory address or a memory location in which the first physical file is stored (e.g., the reference may include the first file path). For example, the application may provide the reference to the first file path along with log data when causing the log data to be stored in the first physical file. For example, the application may execute code to store data. The code may include a pointer to the first file path. When the code is executed (e.g., by the server device), data and an indication of the first file path may be provided to a data storage location (e.g., the storage device). The storage location may be associated with a memory location or a file location (e.g., the first physical file) in which the data is to be stored based on the first file path.

As shown in FIG. 1B, and by reference number 110, the server device (and/or the application) may write a data stream of the log data associated with the application to the first file path. For example, the application (e.g., the logger) may execute code or instructions associated with causing log data generated by the application to be stored in the first physical file. For example, as shown by reference number 115, data (e.g., log data) may be provided by the application (e.g., by the logger) to the storage device. The application (e.g., and/or the server device) may provide the data and an indication of the first file path (e.g., that identifies a memory location or a file location of the first physical file). The storage device may identify the first physical file based on the first file path. The storage device may store the data (e.g., the log data) in the first physical file. In other words, the server device (e.g., the application and/or the logger) may store a data stream (e.g., of log data) associated with the application to the first file location using the reference to the first file path stored by the application and/or the server device.

For example, the instructions or code associated with writing data to the first physical file may not actually open or establish a connection with the physical file. Rather, the application may simply provide a pointer (e.g., the first file path) to which the data is to be written (e.g., by the server device and/or the storage device). Therefore, the components or functions of the application associated with writing data (e.g., log data) to the physical files may not be aware of a status of the physical files and/or may not receive an indication of whether the physical files actually exist. If the physical file is deleted, a reference to the physical file may still be stored by the storage device (e.g., Java memory may store a reference to the deleted physical file, which may be referred to as a phantom reference or a stale reference). Therefore, no error or exception may be returned to the application (e.g., by the storage device and/or the server device) when the application provides data to be written to a deleted physical file (e.g., because a phantom reference to the deleted physical file may still exist in memory).

Therefore, the application (e.g., the policy manager) may periodically perform checks to determine whether the physical file actually exists (e.g., to determine if the physical file has been deleted). For example, as shown by reference number 120, the server device (e.g., the application and/or the policy manager) may detect a trigger event associated with checking whether the first file path is valid. For example, the trigger event may be associated with checking whether a physical file exists in the first file location (e.g., identified by the first file path). In some implementations, the trigger event may be indicated by a policy file associated with generating the log data associated with the application. For example, policy information may be defined and/or stored by the application. The policy information may include an indication of the trigger event.

In some implementations, the trigger event may be a time-based trigger event. For example, the trigger event may be based on an amount of time from a time at which the code (e.g., associated with determining whether the physical file exists) was last executed. For example, after executing the code, the server device and/or the application may initiate a timer. The server device and/or the application may execute the code and/or instructions again based on an expiration of the timer. In other words, according to an interval or period of time (e.g., N minutes), the server device and/or the application may determine (e.g., every N minutes) whether the physical file exists or has been deleted. In some implementations, the amount of time (e.g., N minutes) may be less than or equal to an RPO time associated with the application. For example, a data recovery plan may be defined for the application and/or may be stored in a policy file (e.g., by the policy manager). The data recovery plan may define an amount of time (e.g., the RPO time) associated with a maximum acceptable amount of data loss after an unplanned data-loss incident associated with the application. In other words, the RPO time may be an amount of time that an application may be permitted to not store data (e.g., thereby defining a maximum amount of data that an organization associated with the application can tolerate losing). In some implantations, the RPO time may be associated with an amount of time during which lost data can be restored (e.g., after the RPO time, data may not be restored). Therefore, the trigger event may be a time-based trigger that is associated with an amount of time that is less than or equal to the RPO time (e.g., to ensure that the application is enabled to detect deletion of one or more physical files within the defined RPO time).

In some implementations, the policy manager may store multiple trigger events. For example, a first trigger event may be associated with a size of the first physical file in the first file path. For example, the application (e.g., the policy manager) may determine a size of the first physical file. If the application (e.g., the policy manager) determines that the size of the first physical file satisfies a threshold, then the application (e.g., the policy manager) may determine that a new physical file is to be created for storing the log data. A second trigger event may be associated with whether the physical file exists (e.g., has been deleted) in the first file path. In other words, triggers for creating a new physical file for storing log data generated by the application may include a size of the physical file satisfying the threshold and/or detecting that the physical file has been deleted.

As described above, the trigger event associated with checking if the first physical file exists may be a time-based trigger. Additionally, or alternatively, the trigger event associated with checking if the first physical file exists may be based on a user input received by the application and/or the server device (e.g., a user input may trigger the application to check if the physical file has been deleted, as described in more detail elsewhere herein). Additionally, or alternatively, the trigger event associated with checking if the first physical file exists may be based on a size of the physical file. For example, if a size of the physical file remains the same and/or does not increase by a certain amount over a period of time, then the application and/or the server device may check if the physical file has been deleted (e.g., because if the physical file exists, then a size of the physical file may be expected to increase over time as new data is stored in the physical file).

The server device and/or the application may determine whether the first physical file exists based on detecting the trigger event associated with checking if the first physical file exists. For example, the server device and/or the application may execute code and/or instructions that cause the server device to determine whether the first physical file exists. In some implementations, the code or instructions may be associated with an asynchronous thread of execution associated with the application. In other words, the code or instructions may be executed independently from writing the log data via the first file path. For example, the server device and/or the application may simultaneously write the log data via the first file path and determine whether the first physical file exists. This may ensure that the flow or process of writing or storing the log data via the first file path is not interrupted by the check to determine if the first physical file has been deleted.

For example, as shown by reference number 125, the server device and/or the application may attempt to open a connection with the physical file. For example, the server device and/or the application may execute code associated with performing a function for opening a connection to the first physical file via the first file path. For example, the code may be associated with obtaining data (e.g., input bytes) from the first physical file. For example, the code may be a FileInputStream function associated with opening a connection to the first physical file. As shown by reference number 130, if no error or exception is returned from executing the code (e.g., the FileInputStream function), then the server device and/or the application may determine that the physical file exists. For example, if the server device and/or the application is able to successfully open a connection to the first physical file, then the server device and/or the application may determine that the physical file exists (e.g., has not been deleted).

As shown by reference number 135, based on the server device and/or the application determining that the first physical file exists, the server device and/or the application may continue to write data to the first file location (e.g., to the first file path and/or to the first physical file). For example, the application and/or the policy manager may maintain or store an indicator or a flag (e.g., a Boolean flag) associated with indicating whether the first physical file exists. Based on the server device and/or the application determining that the first physical file exists, the application and/or the policy manager may set the indicator to a value or setting (e.g., "1" or "true") that indicates that the physical file exists (e.g., is not deleted). Based on setting the indicator to the value or setting that indicates that the physical file exists, the application and/or the policy manager may determine that the physical file still exists and that a new physical file does not need to be created (e.g., so long as a size of the first physical file does not satisfy the threshold, as described elsewhere herein). For example, the server device and/or the application may determine that the first physical file exists in the first file location based on successfully opening the connection via the first file path. The server device and/or the application may permit the application to continue to store the data stream in the first file location (e.g., in the first physical file) based on determining that the first physical file exists in the first file location.

As shown in FIG. 1C, and by reference number 140, the server device and/or the application may detect a trigger event associated with checking if the first physical file exists (e.g., in a similar manner as described above, such as in connection with reference number 120). For example, the server device and/or the application may detect that an amount of time (e.g., N minutes) has passed since the server device and/or the application last executed code or instructions associated with determining whether the first physical file exists. For example, the server device and/or the application may detect that it has been N minutes since the server device and/or the application executed the code or instructions as described above in connection with reference numbers 125 and/or 130. In other words, as described above, every N minutes, the server device and/or the application may determine if the first physical file exists. Additionally, or alternatively, the server device and/or the application may detect another trigger event (e.g., other than a time-based trigger) associated with checking if the first physical file exists (e.g., in a similar manner as described above).

As shown by reference number 145, the server device and/or the application may attempt to open a connection with the physical file. For example, the server device and/or the application may execute code associated with performing a function for opening a connection to the first physical file via the first file path. For example, the code may be associated with obtaining data (e.g., input bytes) from the first physical file. For example, the code may be a FileInputStream function associated with opening a connection to the first physical file. However, as shown in FIG. 1C, the first physical file may have been deleted from the first file location (e.g., from the storage device).

As shown by reference number 150, the server device and/or the application may determine that the first physical file does not exist based on executing the code or instructions. For example, the server device and/or the application may determine that the first physical file does not exist in the first file path based on the function (e.g., the FileInputStream function) returning a "file not found" exception (e.g., a FileNotFoundException). For example, the exception may be provided (e.g., by the storage device or the server device) to the application to indicate that an attempt to open the physical file indicated by the first file path has failed. For example, the application may provide an indication to the storage device to establish a connection with the first physical file (e.g., via the FileInputStream function) by providing an indication of the first file path. The storage device, based on receiving the indication, may attempt to open the first physical file via the first file path. If the storage device determines that the attempt to open the first physical file has failed (e.g., because the first physical file has been deleted, is corrupted, or for another reason), then the storage device may transmit, to the server device and/or the application, an exception indication that indicates that the attempt to open the first physical file has failed.

Therefore, by executing (e.g., periodically) the code or instructions that cause an attempt to be made to open the first physical file, the server device and/or the application may be enabled to determine whether the first physical file actually exists (or has been deleted or is otherwise inaccessible). As shown by reference number 155, based on determining that the first physical file does not exist or is invalid (e.g., has been deleted or is otherwise inaccessible), the server device and/or the application may cause the application to write the data (e.g., the data stream of the log data) to a second file location (e.g., to a second physical file).

For example, the server device and/or the application may cause the indicator and/or Boolean flag to be set to a value or setting (e.g., "0" or "false") that indicates that the physical file does not exist based on determining that the physical file does not exist. The application may provide, to the policy manager (e.g., a log data policy manager associated with the application) information including the indicator and/or the Boolean flag to cause a second file path to be created and to cause the reference stored by the application to be updated to the second file path based on the indicator and/or Boolean flag being set to the value or setting. In some implementations, the first file path and the second file path are associated with different cloud storage locations (e.g., on the storage device).

For example, the server device and/or the application may communicate with the storage device to cause a second physical file to be generated or created. The server device and/or the application may obtain (e.g., from the storage device) a second file path that indicates a second file location or a second memory location in which the second physical file is stored. As shown by reference number 160, the server device and/or the application (e.g., the policy manager) may update the reference or pointer stored by the application (e.g., by the logger) for storing log data from the first file path (e.g., the first file location) to the second file path (e.g., the second file location). In other words, based on determining that the first physical file does not exist or is invalid (e.g., has been deleted or is otherwise inaccessible), the application may cause a second physical file to be created and a reference for writing log data to be switched to a second file path associated with the second physical file. In some implementations, the server device and/or the application may archive (e.g., remove from a memory of the application) the first file path based on updating the reference to the second file path. This may ensure that the application no longer uses the first file path for writing data that arrives via the data stream.

For example, the server device and/or the application (e.g., the logger) may write, based on updating the reference to the second file path, the data stream of the log data associated with the application to the second file path. This may enable the application to autonomously detect (e.g., without receiving user input or rebooting) that a physical file to which the application is writing a data stream has been deleted and/or is otherwise inaccessible. By causing the second physical file to be created and the reference for writing log data to be switched to the second file path associated with the second physical file, data that would have otherwise been lost by the application writing the data to the first file path may be stored in the second physical file (e.g., thereby reducing data loss).

The server device and/or the application may continue to periodically execute code or instructions associated with checking whether the second physical file exists in the second file location by opening a connection via the second file path (e.g., in a similar manner as described above in connection with the first physical file). As a result, an application that generates and stores data (e.g., log data) may be enabled to detect that a physical file, indicated by a file path referenced by the application for storing the data, has been deleted. For example, periodically creating an asynchronous thread of execution may enable the application to check whether a physical file where data is being written to has been deleted. In other words, this may enable the application to be aware of the status of the actual physical file. This may enable the application to create a new physical file and update the reference stored by the application to write the data to the new physical file when the physical file has been deleted. As a result, data loss when the physical file is deleted may be reduced. For example, the application may not continue to write data to the deleted physical file. For example, the application may execute code associated with determining whether the physical file has been deleted based on an amount of time (e.g., N minutes) from a time at which the code was last executed. Because the amount of time (e.g., N minutes) may be less than or equal to an amount of time associated with a maximum acceptable amount of data loss after an unplanned data-loss incident, data lost due to the physical file being deleted may be reduced to an acceptable amount of data loss (e.g., as defined by the RPO associated with the application).

As indicated above, FIGS. 1A-1C are provided as an example. Other examples may differ from what is described with regard to FIGS. 1A-1C.

Figure 2:
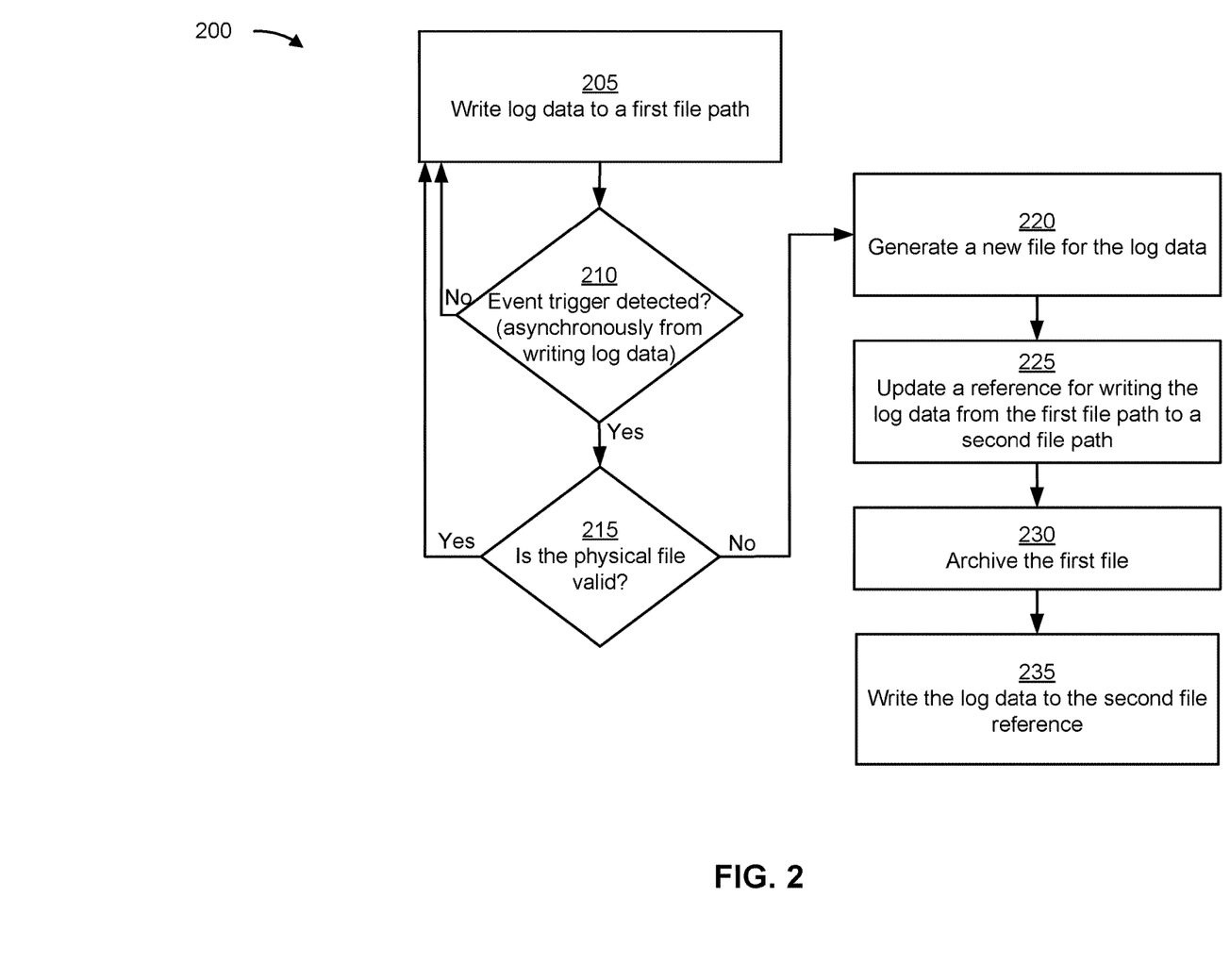
FIG. 2 is a diagram of an example process associated with a refresh of a stale reference to a physical file location, in accordance with some embodiments of the present disclosure.

FIG. 2 is a diagram of an example process 200 associated with a refresh of a stale reference to a physical file location. The blocks, steps, and/or operations of process 200 may be performed by one or more of the devices described above in connection with FIGS. 1A-1C, such as the server device, the application executing on the server device, and/or the storage device, among other examples.

As shown by reference number 205, the process 200 may include writing log data to a first file path. For example, the server device and/or the application may generate data (e.g., log data). The server device and/or the application may provide (e.g., to the storage device) the data along with an indication of a first file path to cause the data to be stored in a first physical file. As described elsewhere herein, the first file path may indicate a file location and/or a memory location in which the first physical file is stored.

As shown by reference number 210, the process 200 may include determining whether an event trigger is detected. As described in connection with FIGS. 1A-1C, the event trigger may be associated with checking or determining whether the first physical file exists and/or is valid (e.g., is accessible). For example, the event trigger may be a time-based trigger (e.g., every N minutes, an event trigger may be detected). Additionally, or alternatively, the event trigger may be based on a user input and/or a size of the first physical file. If an event trigger is not detected (e.g., No), then the log data may be written to the first file path. For example, the server device and/or the application may continue to cause the log data to be stored in the first physical file.

If the event trigger is detected (e.g., Yes), then the process 200 may include determining whether the first physical file is valid (e.g., as shown by reference number 215). For example, the server device and/or the application may determine whether the first physical file exists (e.g., in a location indicated by the first file path) and/or is accessible. For example, in a similar manner as described above in connection with FIGS. 1A-1C, the server device and/or the application may attempt to open a connection with the first physical file via the first file path. The server device and/or the application may continue to cause the log data to be stored in the first physical file while it is determined whether the first physical file is valid. In other words, the determination of whether the first physical file is valid may be performed asynchronously from writing the log data to the first file path (e.g., so that the determination does not interrupt the writing or storing of the log data). If the first physical file exists, is valid, and/or is accessible (e.g., Yes), then the log data may be written to the first file path. For example, the server device and/or the application may continue to cause the log data to be stored in the first physical file.

If the first physical file does not exist (e.g., has been deleted), is invalid, and/or is otherwise inaccessible (e.g., No), then the process 200 may include generating or creating a new physical file (e.g., a second physical file) to be used to store the log data (e.g., as shown by reference number 220). For example, the server device and/or the application may communicate with the storage device to cause the second physical file to be generated. As another example, the server device may generate the second physical file in a memory location associated with the server device. The second physical file may be associated with a second file path (e.g., identifying a file location and/or a memory location in which the second physical file is stored).

In other words, the server device and/or the application may selectively cause a data stream (e.g., the log data) to be stored in the first file location (e.g., in the first physical file) or a second file location (e.g., in the second physical file) based on determining whether the physical file exists in the first file location. For example, if the first physical file exists and/or is accessible (e.g., Yes), then the server device and/or the application may cause the data stream (e.g., the log data) to be stored in the first file location (e.g., in the first physical file). Alternatively, if the first physical file does not exist (e.g., has been deleted) and/or is inaccessible (e.g., No), then the server device and/or the application may cause the data stream (e.g., the log data) to be stored in the second file location (e.g., in the second physical file).

As shown by reference number 225, the process 200 may include updating a reference or pointer for writing the log data from the first file path to the second file path. For example, the server device and/or the application may update the reference used to store generated log data (e.g., a reference to the physical file in which the generated log data is to be stored) to the second file path. This may cause the generated log data to be stored in the second physical file (e.g., as described elsewhere herein). In some implementations, as shown by reference number 230, process 200 may include archiving the first physical file and/or a reference to the first file path. For example, the server device and/or the application may remove one or more references to the first physical file and/or to the first file path from a memory.

As shown by reference number 235, the process 200 may include writing log data to the second file path. For example, the server device and/or the application may generate data (e.g., log data). The server device and/or the application may provide (e.g., to the storage device) the data along with an indication of the second file path to cause the data to be stored in the second physical file. As described elsewhere herein, the second file path may indicate a file location and/or a memory location in which the second physical file is stored. As a result, an application that is associated with generating and/or storing log data to a remote physical file may be enabled to asynchronously determine when the physical file has been deleted and/or is otherwise inaccessible. This may reduce data loss that would have otherwise occurred if the application were to continue to attempt to store data in the physical file that has been deleted and/or is otherwise inaccessible.

Although FIG. 2 shows example blocks of process 200, in some implementations, process 200 may include additional blocks, fewer blocks, different blocks, or differently arranged blocks than those depicted in FIG. 2. Additionally, or alternatively, two or more of the blocks of process 200 may be performed in parallel (such as the blocks depicted by reference numbers 205, 210, and/or 215). The process 200 is an example of one process that may be performed by one or more devices described herein. These one or more devices may perform one or more other processes based on operations described herein, such as the operations described in connection with FIGS. 1A-1C. Moreover, while the process 200 has been described in relation to the devices and components of the preceding figures, the process 200 can be performed using alternative, additional, or fewer devices and/or components. Thus, the process 200 is not limited to being performed with the example devices, components, hardware, and software explicitly enumerated in the preceding figures.

Figure 3:
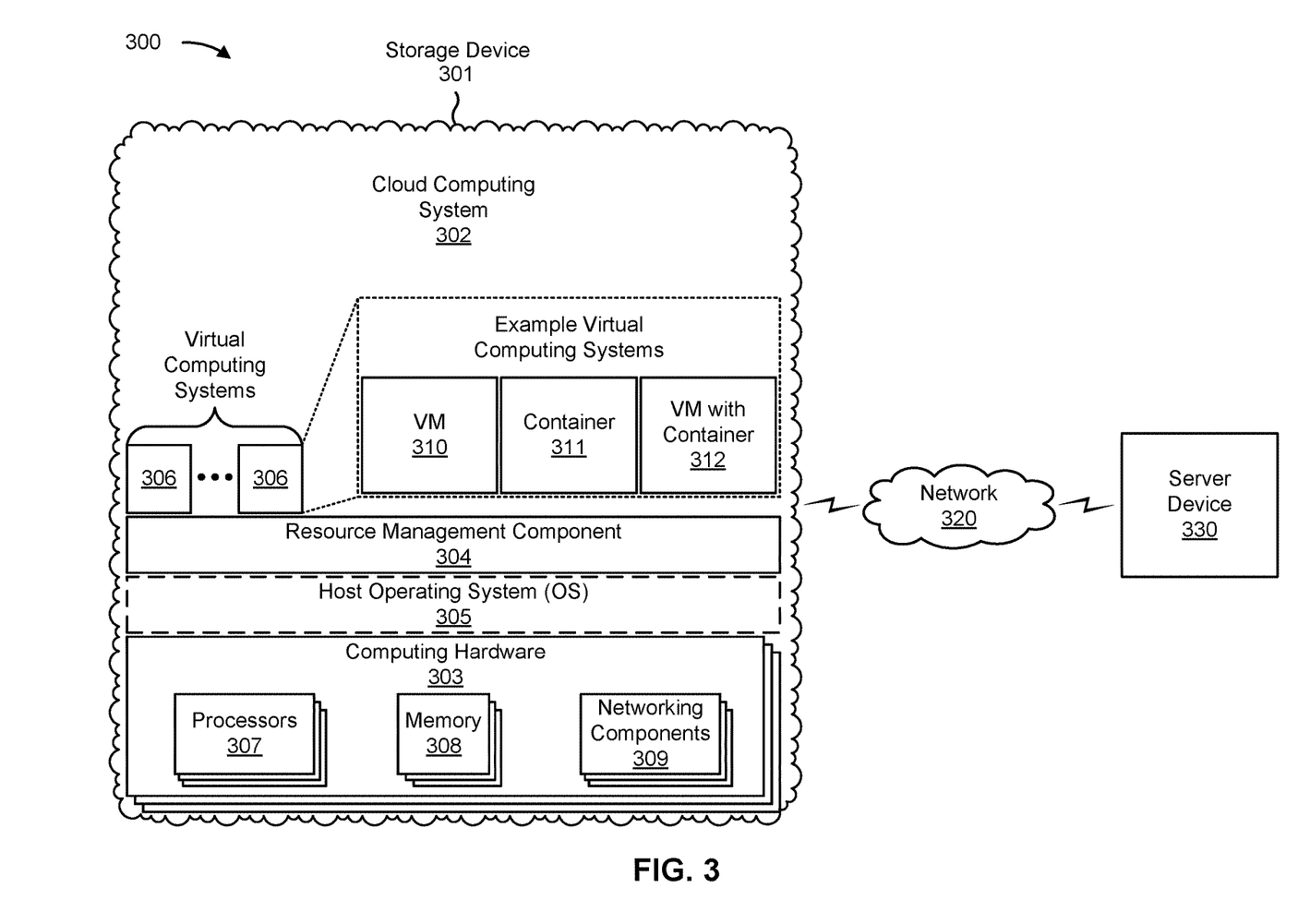
FIG. 3 is a diagram of an example environment in which systems and/or methods described herein may be implemented, in accordance with some embodiments of the present disclosure.

FIG. 3 is a diagram of an example environment 300 in which systems and/or methods described herein may be implemented. As shown in FIG. 3, environment 300 may include a storage device 301, which may include one or more elements of and/or may execute within a cloud computing system 302. The cloud computing system 302 may include one or more elements 303-312, as described in more detail below. As further shown in FIG. 3, environment 300 may include a network 320 and/or a server device 330. Devices and/or elements of environment 300 may interconnect via wired connections and/or wireless connections.

The cloud computing system 302 includes computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

Computing hardware 303 includes hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, and/or one or more networking components 309. Examples of a processor, a memory, and a networking component (e.g., a communication component) are described elsewhere herein.

The resource management component 304 includes a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 310. Additionally, or alternatively, the resource management component 304 may include a container manager, such as when the virtual computing systems 306 are containers 311. In some implementations, the resource management component 304 executes within and/or in coordination with a host operating system 305.

A virtual computing system 306 includes a virtual environment that enables cloud-based execution of operations and/or processes described herein using computing hardware 303. As shown, a virtual computing system 306 may include a virtual machine 310, a container 311, or a hybrid environment 312 that includes a virtual machine and a container, among other examples. A virtual computing system 306 may execute one or more applications using a file system that includes binary files, software libraries, and/or other resources required to execute applications on a guest operating system (e.g., within the virtual computing system 306) or the host operating system 305.

Although the storage device 301 may include one or more elements 303-312 of the cloud computing system 302, may execute within the cloud computing system 302, and/or may be hosted within the cloud computing system 302, in some implementations, the storage device 301 may not be cloud-based (e.g., may be implemented outside of a cloud computing system) or may be partially cloud-based. For example, the storage device 301 may include one or more devices that are not part of the cloud computing system 302, such as device 400 of FIG. 4, which may include a standalone server or another type of computing device. The storage device 301 may perform one or more operations and/or processes described in more detail elsewhere herein.

Network 320 includes one or more wired and/or wireless networks. For example, network 320 may include a cellular network, a public land mobile network (PLMN), a local area network (LAN), a wide area network (WAN), a private network, the Internet, and/or a combination of these or other types of networks. The network 320 enables communication among the devices of environment 300.

The server device 330 may include one or more devices capable of receiving, generating, storing, processing, providing, and/or routing information associated with a refresh of a stale reference to a physical file location, as described elsewhere herein. The server device 330 may include a communication device and/or a computing device. For example, the server device 330 may include a server, such as an application server, a client server, a web server, a database server, a host server, a proxy server, a virtual server (e.g., executing on computing hardware), or a server in a cloud computing system. In some implementations, the server device 330 may include computing hardware used in a cloud computing environment. In some implementations, the server device 330 may be associated with a cloud computing system (e.g., similar to the cloud computing system 302).

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
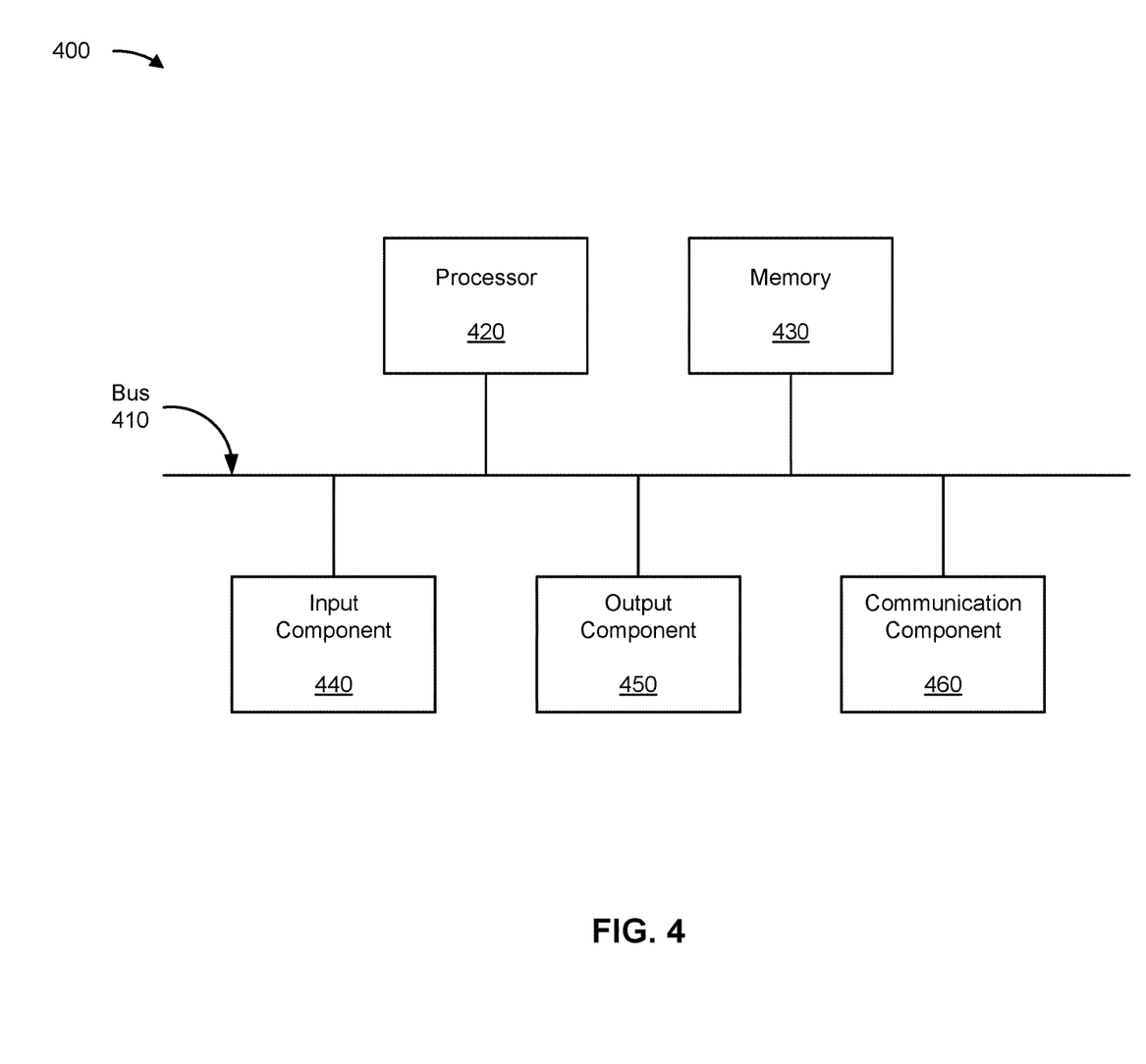
FIG. 4 is a diagram of example components of a device associated with a refresh of a stale reference to a physical file location, in accordance with some embodiments of the present disclosure.

FIG. 4 is a diagram of example components of a device 400 associated with a refresh of a stale reference to a physical file location. Device 400 may correspond to the storage device 301 and/or the server device 330, among other examples. In some implementations, the storage device 301 and/or the server device 330 may include one or more devices 400 and/or one or more components of device 400. As shown in FIG. 4, device 400 may include a bus 410, a processor 420, a memory 430, an input component 440, an output component 450, and a communication component 460.

Bus 410 may include one or more components that enable wired and/or wireless communication among the components of device 400. Bus 410 may couple together two or more components of FIG. 4, such as via operative coupling, communicative coupling, electronic coupling, and/or electric coupling. Processor 420 may include a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 may include one or more processors capable of being programmed to perform one or more operations or processes described elsewhere herein.

Memory 430 may include volatile and/or nonvolatile memory. For example, memory 430 may include random access memory (RAM), read only memory (ROM), a hard disk drive, and/or another type of memory (e.g., a flash memory, a magnetic memory, and/or an optical memory). Memory 430 may include internal memory (e.g., RAM, ROM, or a hard disk drive) and/or removable memory (e.g., removable via a universal serial bus connection). Memory 430 may be a non-transitory computer-readable medium. Memory 430 stores information, instructions, and/or software (e.g., one or more software applications) related to the operation of device 400. In some implementations, memory 430 may include one or more memories that are coupled to one or more processors (e.g., processor 420), such as via bus 410.

Input component 440 enables device 400 to receive input, such as user input and/or sensed input. For example, input component 440 may include a touch screen, a keyboard, a keypad, a mouse, a button, a microphone, a switch, a sensor, a global positioning system sensor, an accelerometer, a gyroscope, and/or an actuator. Output component 450 enables device 400 to provide output, such as via a display, a speaker, and/or a light-emitting diode. Communication component 460 enables device 400 to communicate with other devices via a wired connection and/or a wireless connection. For example, communication component 460 may include a receiver, a transmitter, a transceiver, a modem, a network interface card, and/or an antenna.

Device 400 may perform one or more operations or processes described herein. For example, a non-transitory computer-readable medium (e.g., memory 430) may store a set of instructions (e.g., one or more instructions or code) for execution by processor 420. Processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry is used instead of or in combination with the instructions to perform one or more operations or processes described herein. Additionally, or alternatively, processor 420 may be configured to perform one or more operations or processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
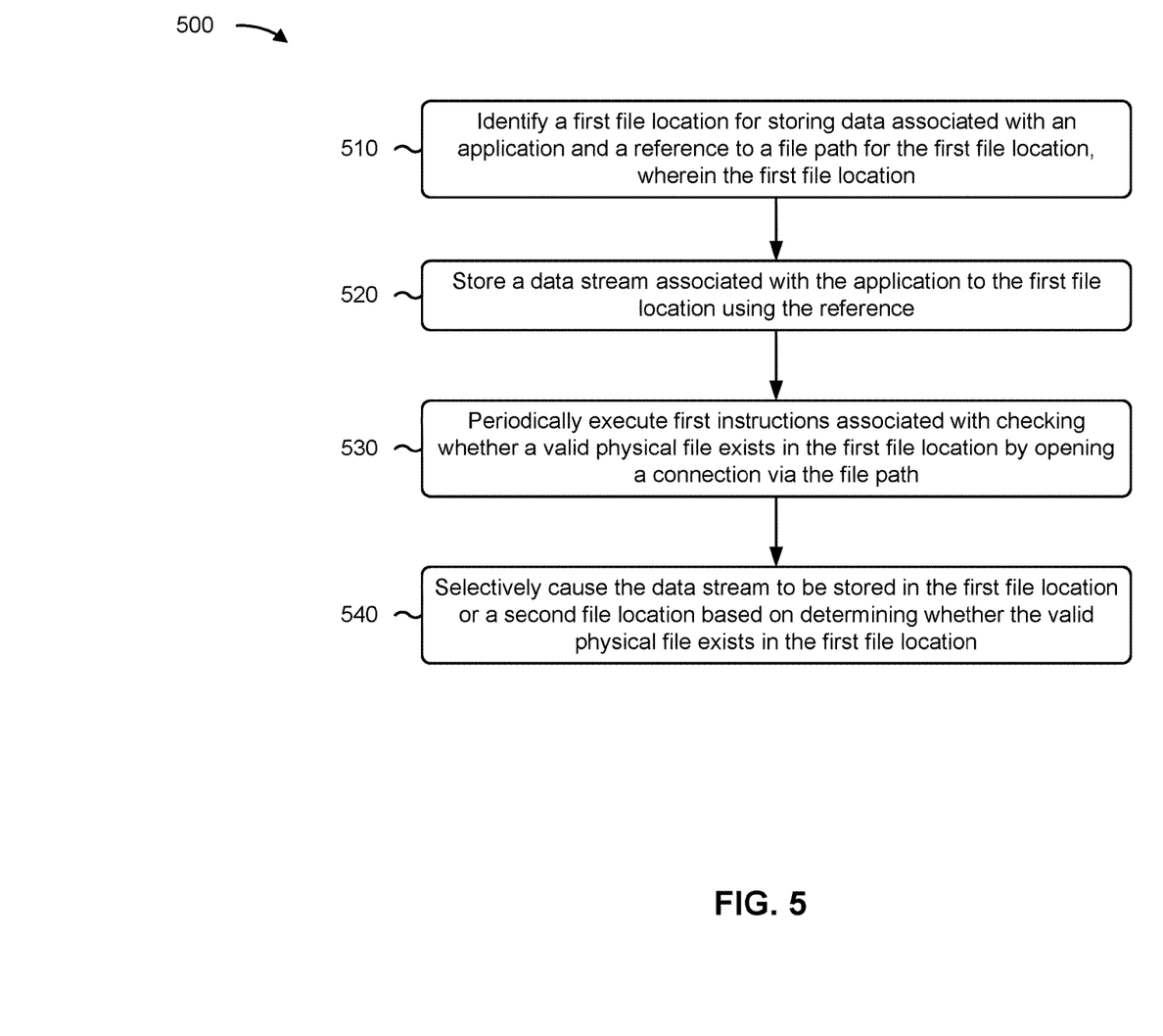
FIG. 5 is a flowchart of an example process associated with a refresh of a stale reference to a physical file location, in accordance with some embodiments of the present disclosure.

FIG. 5 is a flowchart of an example process 500 associated with a refresh of a stale reference to a physical file location. In some implementations, one or more process blocks of FIG. 5 may be performed by the server device 330. In some implementations, one or more process blocks of FIG. 5 may be performed by another device or a group of devices separate from or including the server device 330, such as the storage device 301. Additionally, or alternatively, one or more process blocks of FIG. 5 may be performed by one or more components of the device 400, such as processor 420, memory 430, input component 440, output component 450, and/or communication component 460.

As shown in FIG. 5, process 500 may include identifying a first file location for storing data associated with an application and a reference to a file path for the first file location (block 510). For example, the server device 330 (e.g., using processor 420 and/or memory 430) may identify a first file location for storing data associated with an application and a reference to a file path for the first file location, as described above in connection with reference number 105 of FIG. 1A. As an example, the server device (and/or an application executing on the server device) may cause data to be stored in a physical file by identifying a first file path (e.g., that identifies the first file location).

As further shown in FIG. 5, process 500 may include storing a data stream associated with the application to the first file location using the reference (block 520). For example, the server device 330 (e.g., using processor 420 and/or memory 430) may store a data stream associated with the application to the first file location using the reference, as described above in connection with reference numbers 110 and/or 115 of FIG. 1B. As an example, the server device (and/or an application executing on the server device) may provide data along with an indication of the first file path to cause the data to be stored in the first physical file.

As further shown in FIG. 5, process 500 may include periodically executing first instructions associated with checking whether a valid physical file exists in the first file location by opening a connection via the file path (block 530). For example, the server device 330 (e.g., using processor 420 and/or memory 430) may periodically execute first instructions associated with checking whether a valid physical file exists in the first file location by opening a connection via the file path, as described above in connection with reference numbers 120, 125, 140, and/or 145 of FIGS. 1B and 1C. In some implementations, the first instructions are executed independently of second instructions associated with storing the data stream. As an example, the server device (and/or the application) may detect a trigger event (e.g., a time-based trigger or another trigger event) that causes the server device (and/or the application) to execute code or instructions associated with attempting to open a connection with the first physical file. If the connection is successfully established, then the server device (and/or the application) may determine that the first physical file exists and/or is valid. If the connection is not successfully established, then the server device (and/or the application) may determine that the first physical file has been deleted and/or is inaccessible (e.g., the first physical file may be invalid and/or deleted).

As further shown in FIG. 5, process 500 may include selectively causing the data stream to be stored in the first file location or a second file location based on determining whether the valid physical file exists in the first file location (block 540). For example, the server device 330 (e.g., using processor 420 and/or memory 430) may selectively cause the data stream to be stored in the first file location or a second file location based on determining whether the valid physical file exists in the first file location, as described above in connection with reference number 135 of FIG. 1B and reference number 155 of FIG. 1C. As an example, the second file location may be associated with a second physical file. If the first physical file exists and/or is accessible, then the server device (and/or the application) may cause the data stream (e.g., the log data) to be stored in the first file location (e.g., in the first physical file). Alternatively, if the first physical file does not exist (e.g., has been deleted) and/or is inaccessible, then the server device and/or the application may cause the data stream (e.g., the log data) to be stored in the second file location (e.g., in the second physical file).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. The process 500 is an example of one process that may be performed by one or more devices described herein. These one or more devices may perform one or more other processes based on operations described herein, such as the operations described in connection with FIGS. 1A-C and 2. Moreover, while the process 500 has been described in relation to the devices and components of the preceding figures, the process 500 can be performed using alternative, additional, or fewer devices and/or components. Thus, the process 500 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for refreshing a reference to physical file paths, the system comprising:
one or more memories; and
one or more processors, coupled to the one or more memories, configured to:
create a first file path for storing log data associated with an application,
wherein the application stores a reference to the first file path for writing the log data;
write a data stream of the log data associated with the application to the first file path;
detect a trigger event that is based on a size of a first physical file over a period of time, wherein detecting the trigger event causes one or more actions associated with checking whether the first physical file exists in a location associated with the first file path;
execute, based on detecting the trigger event, code associated with performing a function for opening a connection to the first physical file via the first file path to determine whether the first physical file exists in the location associated with the first file path, wherein the code is executed independently of writing the data stream of the log data associated with the application;
create, upon determining that the first physical file does not exist, a second physical file and a second file path associated with the second physical file for storing the log data associated with the application,
wherein the reference stored by the application is updated to the second file path; and
write, based on updating the reference to the second file path, the data stream of the log data associated with the application to the second file path.

2. The system of claim 1, wherein the trigger event is indicated by a policy file associated with generating the log data associated with the application.

3. The system of claim 1, wherein the size of the first physical file does not increase by a certain amount over the period of time.

4. The system of claim 1, wherein the period of time is less than or equal to a recovery point objective (RPO) time associated with the application.

5. The system of claim 1, wherein the one or more processors are further configured to:
cause a Boolean flag to be set to a value that indicates that the first physical file does not exist based on determining that the first physical file does not exist; and
provide, to a log data policy manager associated with the application, information including the Boolean flag to cause the second file path to be created and to cause the reference stored by the application to be updated to the second file path based on the Boolean flag being set to the value.

6. The system of claim 1, wherein the trigger event includes:
a first trigger event associated with a size of the first physical file in the first file path, and
a second trigger event associated with whether the first physical file exists in the first file path.

7. The system of claim 1, wherein the one or more processors are further configured to:
archive the first file path based on determining that the first physical file does not exist in the first file path.

8. The system of claim 1, wherein the first file path and the second file path are associated with different cloud storage locations.

9. The system of claim 1, wherein the one or more processors to execute the code associated with opening a connection to the first physical file via the first file path, are configured to:
generate an asynchronous thread of execution in the application associated with determining whether the first physical file exists.

10. The system of claim 1, wherein the code is executed concurrently with writing the data stream of the log data via the first file path.

11. The system of claim 1, wherein the code is associated with obtaining data from the first physical file.

12. A method for refreshing a stale reference to file locations for storing data, comprising:
identifying, by a server device, a first file location for storing data associated with an application and a reference to a file path for the first file location,
storing, by the server device, a data stream associated with the application to the first file location using the reference;
detecting, by the server device, a trigger event that is based on a size of a first physical file over a period of time, wherein detecting the trigger event causes one or more actions associated with checking whether the first physical file exists in the first file location;
executing, by the server device and based on detecting the trigger event, first instructions associated with performing a function for opening a connection to the first physical file via the file path,
wherein the first instructions are executed concurrently with second instructions associated with storing the data stream; and
selectively generating, by the server device and based on determining whether the first physical file exists in the first file location, a second physical file associated with a second file location for storing the data stream.

13. The method of claim 12, wherein selectively generating the second physical file associated with the second file location for storing the data stream comprises:
determining that the first physical file does not exist in the first file location based on a file not found exception being returned when opening the connection via the file path; and
updating, for the application, the reference to the file path from the first file location to the second file location based on determining that the first physical file does not exist in the first file location.

14. The method of claim 12, further comprising:
executing the first instructions based on an expiration of a timer, and
wherein a first amount of time associated with the timer is less than a second amount of time associated with a maximum acceptable amount of data loss after an unplanned data-loss incident associated with the application.

15. The method of claim 12, wherein selectively generating the second physical file associated with the second file location for storing the data stream comprises:
determining that the first physical file does not exist in the first file location based on a file not found exception being returned when opening the connection via the file path;
causing an indicator to be set to a value that indicates that the first physical file does not exist based on determining that the first physical file does not exist in the first file location; and
providing, to a data policy manager associated with the application, information including the indicator to cause the second file location to be generated and to cause the reference stored by the application to be updated to the second file location based on the indicator.

16. The method of claim 12, wherein the data stream is associated with log data generated by the application.

17. A non-transitory computer-readable medium storing a set of instructions, the set of instructions comprising:
one or more instructions that, when executed by one or more processors of a device, cause the device to:

identify a first file location for storing log data associated with an application,
    wherein the application stores a reference to the first file location for writing the log data;
write a data stream of the log data associated with the application to the first file location;
detect a trigger event that is based on a size of a first physical file over a period of time, wherein detecting the trigger event causes one or more actions associated with checking whether the first physical file exists in the first file location;
execute, based on detecting the trigger event, code associated with performing a function for opening a connection to the first physical file via the reference to the first file location,
    wherein the code is executed independently of writing the data stream of the log data associated with the application;
generate, based on determining that the first physical file does not exist in the first file location, a second physical file associated with a second file location for storing the log data associated with the application; and
update the reference from the first file location to the second file location.

18. The non-transitory computer-readable medium of claim 17,
    wherein the trigger event is indicated by a policy file associated with generating the log data associated with the application.

19. The non-transitory computer-readable medium of claim 17,
    wherein the period of time associated with the trigger event is less than or equal to a recovery point objective (RPO) time associated with the application.

20. The non-transitory computer-readable medium of claim 17,
    wherein the one or more instructions, that cause the device to execute the code, cause the device to:
        determine that the first physical file does not exist in the first file location based on the function returning a file not found exception.

* * * * *